3,407,164
POLYMERIC DISPERSION, ARTICLES IMPREGNATED THEREWITH AND METHODS THEREFOR
George F. Schmidt, Dover, Del., assignor to Standard Brands Chemical Industries, Inc., Dover, Del., a corporation of Delaware
No Drawing. Filed Aug. 26, 1965, Ser. No. 482,929
10 Claims. (Cl. 260—29.7)

ABSTRACT OF THE DISCLOSURE

A latex composition characterized by enhanced adhesive-bonding and fiber-bonding properties comprising a mixture of polymer solids uniformly dispersed in an aqueous dispersion, the mixture containing from about 15 to about 50% by weight of an acrylic ester-diene copolymer (e.g. one prepared from a monomeric mixture containing about 50% of butadiene and about 50% of methyl methacrylate); from about 20 to about 40% by weight of a carboxyl-containing diene copolymer (e.g. one prepared from a monomeric mixture of about 75% of butadiene, about 22% of styrene and about 3% of itaconic acid); and from about 25 to about 60% of another diene copolymer (e.g. one produced from a monomeric mixture containing about 50% butadiene and about 50% styrene); the weight percentages of the copolymers being based on the total polymer solids in the aqueous dispersion. Articles of non-woven fibrous materials bonded with the latex composition, as well as a method of forming pressure sensitive adhesive tapes without a tie coat, are also disclosed.

---

This invention relates to latex compositions containing mixtures of certain conjugated diolefinic copolymers exhibiting enhanced adhesive and fiber-bonding properties, and to the improved unifiied non-woven fibrous articles saturated with said latex compositions.

More particularly, the invention relates to a latex composition containing at least three conjugated diene copolymers admixed in selected proportions to provide a unique combination of adhesive-bonding and fiber-bonding properties thereto and to flexible non-woven fibrous sheetings such as paper, non-woven fabrics, and the like, containing the latex composition. In one specific aspect, this invention relates to saturated paper backing sheets, particularly suitable for fabrication into pressure-sensitive adhesive tapes and the tapes so produced; the sheets being characterized by a combination of an unexpected development of excellent adherence for pressure-sensitive adhesives and improved fiber-bonding properties, i.e., edge tear and high resistance to delamination, together with other desirable properties.

As used herein, the term "non-woven fibrous materials" refers to a mat, web or sheet of fibers which has been laid down by a mechanical, pneumatic, electrical or vacuum means, or otherwise deposited. Typically, the open, highly porous and unbonded mass, webs or mats made of such fibrous materials, have little or no resistance to delamination, splitting or tearing. In many applications of non-woven fibrous materials it is essential that the fibers be bonded so that they possess sufficient internal bond strength in order to avoid splitting or delamination of the fibrous structures when subjected to the stresses of normal use.

Heretofore, various natural and synthetic polymer latices have been used as bonding agents to impregnate or saturate non-woven fibrous materials to convert these materials into useful backings for pressure-sensitive tapes and the like. In practice, however, the latices heretofore used have had limitations as bonding agents. For example, in order for the latices to provide satisfactory internal bond strength to the saturated non-woven fabrics it has often been necessary to substantially completely saturate the non-woven fibrous materials with copolymers especially prepared for this purpose.

Also, it has been found that although satisfactory internal bond could be achieved by using a specific copolymer latex, other desired fiber-bonding properties such as elongation, or edge tear were not obtained to the desired degree. Accordingly, it is often necessary to change the monomer content or the coplymer latex in order to provide the additional fiber bonding properties. However, this practice usually causes a reduction in the internal bond strengths developed by the latex.

Furthermore, even when the desired fiber-bonding properties have been approximate, the resulting latices often do not provide adequate bond for the pressure-sensitive adhesives that are subsequently applied to the bonded non-woven backing to produce a pressure-sensitive tape. Consequently the adhesives often will pull away from the saturated non-woven fibrous materials when placed in normal use. Thus, a tie-coat of an intermediate layer of polymeric material is usually applied to the saturated non-woven fibrous material to insure that the pressure-sensitive adhesive will adequately bond to the bonded material.

While these practices may finally result in satisfactory achievement of both the fiber-bonding in the fabric and increased adhesion between the saturated fabric and pressure-sensitive adhesive, it will be appreciated that such procedures are time-consuming and costly and should be avoided if possible. In order to avoid the difficulties of these prior art practices, the present invention provides improved fiber-bonding properties and excellent bond between saturated non-woven fibrous materials and the pressure-sensitive adhesives while eliminating the necessity of a tie-coat material.

In accordance with this invention it has been found that non-woven fibrous articles having improved fiber-bonding and adhesive-bonding properties are obtained by unifying the fibrous materials with a latex composition or aqueous dispersion comprising from about 15 to 50 percent by weight of at least one acrylic ester-diene copolymer, from about 20 to about 40 percent by weight of at least one carboxyl-containing diene copolymer, and from about 25 to about 60 percent of at least one copolymer of a conjugated diene and an ethylenically unsaturated monomer other than an acrylic ester or a carboxyl-containing monomer; all weight percentages being based on the total copolymer solids in the latex composition. Preferably the latex compositions contain about equal weight proportions of each type of diene copolymer.

In addition, it has been found that the latex compositions of this invention provide impregnating compositions that when used to saturate non-woven fibrous backings for pressure-sensitive tapes eliminate the need for a tie-coat and also provide effective edge tear, delamination resistance, elongation, tensile strength and other desirable properties to the resulting tape.

In general, the diene copolymers suitable for use in the unifying latex compositions of this invention are prepared by emulsion polymerization of a monomeric mixture comprising at least one conjugated diene and at least one ethylenically unsaturated monomer copolymerizable with the diene. The expression "ethylenically unsaturated monomer" as used herein includes copolymerizable monoolefinic monomers and is to be understood as excluding conjugated dienes, but may include other polyolefinic monomers. As hereinafter described in greater detail, each of the monomeric mixtures used to prepare a specific diene copolymer is polymerized in aqueous system that contains polymerization aids, i.e., emulsifiers, modifiers, chelating agents, catalysts, and the like, that are readily compatible with those used to prepare the other copolymers.

Advantageously, the unifying latex compositions of this invention can be prepared by blending or admixing lattices of the diene copolymers in the above-described proportions with agitation by any of one of many conventional mixing techniques. Also, each of the diene copolymers should be prepared in emulsion polymerization systems containing emulsifiers that are the same type or compatible with those used to prepare the other diene copolymers; i.e., all cationic-type, all anionic-type, cationic- and nonionic-type or anionic- and nonionic types. It will be appreciated that adherence to these procedures help prevent coagulation or partial flocculation of the copolymer solids upon admixing of the lattices and also provides improved mechanical stability to the resulting latex composition, i.e., resistance to coagulation by shaking and other agitation during application to the non-woven fibrous materials.

In accordance with this invention, the acrylic ester-containing diene copolymers suitable for producing the unique combination of adhesive-bonding and fiber-bonding properties in the unifying latex compositions are produced from monomeric mixtures containing from about 30 to about 75 percent of at least one aliphatic conjugated diene and from about 25 to about 70 percent of at least one alkyl ester of an acrylic acid. Advantageously, it has been found that the adhesive-bonding properties necessary to eliminate the use of a tie-coat and also maintain the fiber bonding properties such elongation and edge tear are particularly enhanced by the use of a copolymer containing 50 percent by weight of a conjugated diene (e.g. butadiene) and 50 percent by weight of an acrylic ester (e.g. methyl methacrylate).

The monomeric aliphatic conjugated dienes suitable for preparing the diene copolymers include the butadiene-1,3, hydrocarbons such as butadiene-1,3, itself; 2-methyl butadiene-1,3, (isoprene); 2,3-dimethyl butadiene-1,3; piperylene; 2-neopentyl butadiene-1,2; and other hydrocarbon homologs of butadiene-1,2. In addition, the substituted dienes, such as 2-chloro butadiene-1,3; 2-cyano butadiene-1,3; the straight chain conjugated pentadienes; the straight chain and branch chain conjugated hexadienes, and the like, are found suitable. In general, dienes containing more than 10 carbon atoms often polymerize very slowly in the present polymerization systems; consequently it is preferred to employ a diene having ten carbon atoms or less. Dienes having from 4 to 6 carbon atoms have particularly advantageous reaction rates and polymerization characteristics, and therefore are preferred. The butadiene-1,3 hydrocarbons, and butadiene-1,3 in particular are preferred.

Among the esters of an acrylic acid that may be used to prepare the acrylic ester-containing diene copolymers are the low molecular weight alcohol esters of acrylic and α-substituted acrylic acids such as methyl acrylate, ethyl acrylate, butyl acrylate, methyl methacrylate, ethyl methacrylate, butyl methacrylate isobutyl dichloroacrylate, and the like. In general, the alkyl portions of these esters may contain from one to about six carbon atoms.

In general, the carboxyl-containing diene copolymers may be advantageously obtained by copolymerization in an aqueous dispersion containing a minor proportion of at least one copolymerizable carboxyl-containing monomer with a major proportion of one or more aliphatic conjugated dienes and one or more copolymerizable non-carboxylic monoolefinic monomers. It will be appreciated that, as used herein, the term "carboxyl-containing monomer" refers to an olefinically unsaturated monomer containing free carboxyl groups (COOH) or salts thereof; whereas the term "noncarboxylic monomers" has reference to those monomers devoid of carboxyl groups and the salts formed from such groups. Specifically, it has been found that the carboxyl-containing diene copolymers which particularly enhance the internal bond strength of the saturated non-woven fibrous materials when used in combination with the other diene copolymers, are prepared from monomeric mixtures containing from about 20 to about 90 percent of an aliphatic conjugated diene, from about 10 to about 75 percent of at least one non-carboxylic ethylenically unsaturated monomer, and from about 0.5 to about 20 percent of a carboxyl-containing monomer.

The non-carboxylic monoolefinic monomer, which together with the aliphatic conjugated diene constitutes a major portion of the monomeric material for directly preparing the carboxyl-containing diene copolymers useful in the unifying lattices of this invention, may be any such monomer which is copolymerizable with the diene. Such monoolefinic monomers are well known in the art and are indicated by typical monomers set forth below. In particular, the monoolefinic monomer is characterized as one which contains an activated carbon-to-carbon double bond, that is, a monomer containing an olefinic double bond which readily functions in an addition polymerization reaction because of the olefinic double bond being present in the monomer molecule either in the alpha-beta position with respect to a stronger polar or functional group, such as nitrile, carboxylic ester, halogen, keto, amide, and other such groups well known in the art as activating groups, or because it is adjacent to a terminal methylene group, that is, $CH_2=C<$. Among the monoolefinic monomers copolymerizable with the dienes in aqueous dispersion and characterized by the presence of such groups are the aliphatic unsaturated nitriles, such as the lower molecular weight nitriles, acrylonitrile, alpha-chloro acrylonitrile, methacrylonitrile, ethacrylonitrile; the low molecular weight alcohol esters of acrylic and substituted acrylic acids, such as methyl methacrylate, methyl acrylate, methyl ethacrylate, butyl methacrylate, isobutyl dichloro acrylate, and other acrylic esters of alcohols, preferably having from one to six carbon atoms in the alkyl group; styrenes, such as styrene itself, halo, cyano, alkyl, aryl, and other substituted styrenes, for example, vinyl toluene, alpha methyl styrene, alpha chloro styrene, p-cyano styrene, p-phenyl styrene; other polymerizable vinyl compounds such as vinyl naphthalene, vinyl pyridine, vinyl ethers and ketones; and other compounds such as vinylidene chloride.

It is preferred to employ copolymerizable monoolefinic monomers selected from the group consisting of nitriles, styrenes, and lower molecular weight alcohol esters of acrylic and alpha-substituted acrylic acids.

Among the carboxyl-containing monomers particularly suitable for preparing the diene copolymers are the polycarboxylic acids and their partial esters, with the dicarboxylic acids and their half esters being particularly preferred for the purposes of this invention.

In addition, in many instances monocarboxylic acids may be used together with the dicarboxylic acids or their half esters to produce suitable carboxyl-containing diene copolymers.

It is particularly advantageous to utilize one or more olefinically unsaturated polycarboxylic acids containing an activated olefinic double bond which readily functions in an addition polymerization reaction because it is present in the monomer molecule either in the alpha-beta position with respect to a strongly polar or functional group, such as carboxyl or others which are well known as activating groups, or because it is adjacent to a terminal methylene group, $CH_2=C<$.

In general, the polycarboxylic acids may be represented by the following formula:

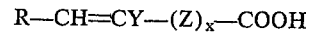

in which R is preferably hydrogen or carboxyl, but may be carboxylic ester or alkyl; Y is hydrogen, carboxyl, halogen, cyano, sulfo, alkyl, aryl, thienyl or furyl; Z is a methylene or a substituted methylene group or an arylene, thienylene or furylene divalent; x is zero or any whole number, suitably not exceeding 3 and in which at least one of the groups R and Y is carboxyl, or Z is carboxyl-containing.

For example, such olefinically unsaturated polycarboxylic acids include fumaric, maleic, citraconic, mesaconic, itaconic, ethyl maleic acid, methyl itaconic, glutaconic, and beta-(p-carboxyphenyl) acrylic. In addition, the dimer and trimer of methacrylic acid and other monoolefinic polycarboxylic acids or their anhydrides which are readily hydrolyzed in the acidic polymerization provide a means for direct introduction of the polycarboxylic acid groups into the polymer chain.

The partial esters of unsaturated polybasic acids employed to prepare the carboxyl-containing diene copolymers of this invention may be prepared from the unsaturated acids having two or more carboxylic groups or the anhydrides thereof. Preferably the partial esters employed are the half esters or monoesters prepared from unsaturated acids containing two carboxyl groups. The monoesters of dibasic acids which are suitably employed have the structural formula:

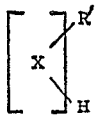

wherein X represents the acid residue of a dibasic acid having from 4 to 8 carbon atoms and preferably from 4 to 5 carbon atoms and R represents an alkyl radical having from 1 to 2 and most preferably 1 carbon atom, and wherein the R' group may be substituted on either of the carboxylic groups of the acid residue. Non-limiting examples of the acids suitable for this use include fumaric, maleic, glutaconic, citraconic, itaconic, mesaconic, aconitic, and the like, with fumaric, maleic, and itaconic acids being preferred. It will be appreciated that, as used herein, the term "unsaturated polybasic acid" includes in addition to the acids exemplified above, dimers, trimers and the like condensation products of unsaturated monocarboxylic acids having two or more carboxyl groups, e.g., dimers and trimers of methacrylic acid.

In accordance with this invention, the R' group is advantageously an alkyl radical of two carbon atoms and preferably one carbon atom, inasmuch as partial esters containing a greater number of carbon atoms in the alcohol portion thereof do not exhibit the enhanced fiber bonding properties of the partial esters of this invention. For reasons of economy and ease of preparation, as well as for the reasons set forth above, the monomethyl ester of itaconic acid is prepared in the presence of small amounts of an esterification catalyst, such as sulfuric acid, paratoluene sulfonic acid, cation exchange resins containing sulfonic acid groups, and the like.

In certain applications such as unified paper backing for pressure-sensitive adhesive tape or other flexible nonwoven unified sheeting, it is particualrly desirable to further enhance the elongation properties of the article. In accordance with this invention, therefore, it has been found possible to provide such desirable elongation in combination with adequate tensile strength and excellent internal bond strength produced by the other diene copolymers by the inclusion of relatively small quantities of a strength-imparting monomeric material to the monomeric mixtures used to prepare the carboxyl-containing diene copolymers. The materials include acrylic and substituted acrylic acids and other copolymerizable ethylenically unsaturated monocarboxylic acids, such as crotonic acid, alpha-chlorocrotonic acid, hydrosorbic acid, cinnamic acid, m-chlorocinnamic acid, p-chlorocinnamic acid, acrylic acid, alpha-chloroacrylic acid, metharylic acid, ethacrylic acid, vinyl thiophenic acid, alphafuryl acrylic acid, vinyl furoic acid, p-vinylbenzoic acid, vinylnaphthoic acid, alpha-isopropenyl acrylic acid, alphastyryl acrylic acid, (2-carboxy-4-phenyl-1,3-butadiene), sorbic acid, alpha-methyl sorbic acid, alpha-ethyl sorbic acid, alpha-chloro sorbic acid, alpha-bromo sorbic acid, beta-chloro sorbic acid, alpha-, beta- or gamma-epsilon dimethyl sorbic acid, 2,4-heptadienoic acid, 2,4-hexadienoic acid, 2,4-pentadienoic acid, alpha-vinyl cinnamic acid, and alpha- and beta-vinyl acrylic acids.

Generally, small amounts of the monocarboxylic acids (about 0.5 percent) are effective for this purpose and, advantageously, the amount need be no more than about 5 percent by weight of the total monomer mixture used for the preparation of the carboxyl-containing diene copolymer.

It will be appreciated that in terms of the ease of copolymerization, the adhesive-bonding and fiber-bonding properties produced with the other diene copolymers, particularly for the development of the highest internal bond strengths, it is preferable to select certain ranges (expressed as percent by weight of the monomer mixture) for the diene and preferred monoolefinically unsaturated monomers charged to the mixture of monomers employed for polymerization of the carboxyl-containing diene copolymers.

For example, nitriles, such as acrylonitrile, when copolymerized in amounts of from 10 to 45 percent, preferably from 15 to 35 percent, with at least 50 percent of the diene and 1 to 5 percent of the polycarboxylic acid, add to the high internal bond developed in the impregnated fibers, together with excellent oil and solvent resistance properties. With styrene and substituted styrenes, amounts of from 10 to 75 percent, and preferably from 15 to 70 percent, may advantageously be used. When utilizing lower molecular weight alcohol esters of acrylic and alpha-substituted acrylic acids, such as methyl methacrylate, it is preferred to charge from about 10 to 70 percent by weight for the additional development of internal bond strength, while further imparting to the bonded fiber the property of non-discoloration on exposure to ultraviolet light.

It is to be understood, however, that lesser quantities of any of these preferred monomers may be present when more than one is utilized. In general, the larger the total amount of such monoolefinic monomers, the greater the increase in plastic properties, and decrease in the elastomeric properties of the diene copolymer with additional development of high tensile strength and lower elongation in the fibrous material saturated with the latex compositions of this invention.

It will be appreciated that the specific proportions of each of the monomers employed are dependent on the monomer selected, as well as on the properties of the admixture of diene copolymers employed in the unifying latex compositions.

Advantageously, other desirable fiber-bonding properties, particularly edge tear and elongation, both of which are essential properties for the production of pressure-sensitive tapes, are also provided by the unifying latex compositions of this invention. Thus, it has been found that these properties are further enhanced by the presence of copolymers prepared from the described aliphatic conjugated dienes and ethylenically unsaturated copolymerizable monomers other than the acrylic esters or the carboxyl-containing monomers. Such diene copolymers may be prepared from a wide variety of monomeric mixtures, and can contain from about 30 to about 65 percent of at least one aliphatic conjugated diene and from about 35 to about 70 percent of at least one of the non-carboxylic monoolefinic unsaturated monomers other than the acrylic esters (e.g., the styrenes, nitriles, and the like). Generally, equal weight proportions of the monomers are preferred.

In addition to the improved fiber-bonding and adhesive-bonding properties exhibited by the bonded non-woven fibrous articles of this invention, it has been found that the articles are characterized by enhanced color retention produced by pigmentation (particularly with bright colors), and resistance to oils and solvents.

The diene copolymer latices utilized in this invention are also advantageously compatible with various resins used in compounding, such as wet strength resins well known to those skilled in the art, for example, melamine-formaldehyde. Also, in many instances in the preparation of unified paper backings for adhesive tape, sandpaper backing, masking tape, printing tape, waterproof wrapping paper, and the like, the impregnated material is subjected to temperatures encountered in drying and in subsequent heat treatment. Such procedures are advantageous in the various applications of the present invention in that the delamination resistance and adhesive bond properties are usually enhanced rather than impaired.

Copolymerization of the monomeric mixtures used to produce the diene copolymers is effected by emulsification of the mixtures used in an aqueous medium containing stable emulsifiers. In order to insure copolymerization of the carboxyl-containing monomers, it is essential that the aqueous medium be acidic, whereas the aqueous media used for polymerization of the other monomers can be either acid or alkaline, and preferably are alkaline.

Suitable emulsifiers include alkyl sulfates or sulfonates and alkylaryl sulfonates in which the alkyl groups contain from 10 to 20 carbon atoms, i.e., sodium lauryl sulfate, sodium dodecylbenzene sulfonate, and the like; alkyl and alkylaryl polyether sulfates such as sodium lauryl ether sulfate, sodium benzyl ether sulfate, sodium tridecyl ether sulfate, and the like; phosphated ethoxylated alcohols such as nonyl phenoxy poly(ethyleneoxy) phosphates containing from about 40 to 90 percent by weight of combined ethylene oxide, and the dinonyl phenoxy poly(ethyleneoxy) phosphates containing from about 50 to 70 percent by weight of combined ethylene oxide; and the alkali metal salts of fatty and rosin acids; and the like. In addition, the polymerization system may also include small amounts of stabilizers such as the sodium salt of polymerized alkyl naphthalene sulfonic acid and others known to the art. Usually, the polymerization reactions are promoted by the addition of free radical yielding initiators such as sodium or potassium persulfate, percarbonates, perborates, and the like; organic peroxides such as benzoyl peroxide, acetyl peroxide, di-t-butyl peroxide, and the like; and the organic hydroperoxides such as di-isopropyl benzene hydroperoxide, and the like. Also redox systems of polymerization initiation may be employed in which the abovementioned initiators are utilized with suitable reducing agents well known in the art.

Small amounts of compounds containing sulfhydryl groups may also be employed. Exemplary of the modifiers are the alkyl mercaptans containing 10 to 22 carbon atoms, such as n-dodecyl mercaptan, the commercially available mixtures of tertiary mercaptans containing 12 to 16 carbon atoms, such as t-dodecyl mercaptan and the like, thiophenol, and the like. It will be understood that a wide range of temperatures may be used to effect polymerization of the monomeric mixtures; i.e., from about 40° to 175° F. and that such polymerization methods result in the formation of polymers in the form of a latex, aqueous dispersion or suspension of small drops or globules.

Advantageously, non-woven fibrous materials may be bonded with the latex compositions of the invention by impregnation such as dip saturation of preformed webs or sheets or by beater addition of an aqueous dispersion of the latex composition directly to the fibers prior to formation of any web or sheeting. In these processes, the three diene copolymers are deposited from a latex or an aqueous dispersion of uniformly dispersed copolymer solids onto the fibers and within the interstices of the open porous web or sheeting.

It will be appreciated that the unifying latex compositions or aqueous dispersion of diene copolymers used as a saturant may be acidic, neutral or alkaline; but as heretofore described it is preferred that the copositions have a pH from about 7.5 to about 11. This pH range is preferred so that the latices exhibit excellent mechanical stability, and good retention of pigments, antioxidants and the like during application to the non-woven fibrous material.

In order to provide a finished, internally bonded saturated web or sheeting, the fibrous material is freed of excess saturant, usually by passing through squeeze rolls or the like; and it is then subjected to a drying operation.

In general, the polymer content on a dry solids basis may be from about 30 to 60 percent by weight of the dry unified web or sheeting, with the amount of each diene copolymer being approximately equal to its proportion in the admixture. For a particular unifying composition, the adhesive bond, internal bond strength and other properties vary with polymer content. This level of polymer content corresponds approximately to 40 to 150 percent saturation or pickup (based on the dry weight of the fibrous material before impregnation).

It is also advantageous in the practice of the invention to subject the unified fibrous article to heat treatment for short periods of time at elevated temperatures, such as from about above 150° F. up to about 400° F.; the time of heat treatment preferably decreasing with increasing temperatures. This enhances the fiber-bonding characteristics of the article prior to application of the pressure-sensitive adhesive. It will be appreciated that lower curing temperature may be employed after the adhesive has been applied to the tapes.

A variety of pressure-sensitive adhesives may be employed to prepare the pressure-sensitive adhesive tapes. In general, these adhesives are rubbery materials, of synthetic or natural polymers dispersed in an organic solvent medium. The most commonly used adhesives are natural rubber adhesives prepared by admixing tackifying resins, natural rubber and plasticizers on a rubber mill, diluting the resulting mass with a solvent to obtain the desired viscosity, and adding anti-oxidants and the like to prevent oxidation and aging.

The unifying latex compositions of the invention are further illustrated in the following examples together with their application to unified non-woven paper backing, i.e., flat back base and creped masking tape. It will be understood that these examples are merely illustrative of the invention and that it has application to various fibrous materials, i.e., webs, flexible and rigid sheeting, and other fibrous articles which are customarily internally bonded, including the woven and non-woven textile fabrics made from fibers such as cotton, rayon, nylon, polyesters, and other natural and synthetic fibers. All references to parts or percentages in the examples are to parts or percentages by weight unless otherwise so stated.

EXAMPLE I

An aqueous solution consisting of 150 parts of water, an emulsifying agent (5.0 parts of Gafac RE–410, a nonylphenoxypoly [ethyleneoxy] phosphate containing about 40 percent by weight of combined ethylene oxide), a chelating agent (0.04 part of ethylenediaminetetraacetic acid), a peroxygen type initiator (0.075 part of potassium persulfate), and a modifier (0.4 part of tertiary dodecyl mercaptan) was placed in the reaction vessel. Then 22 parts of styrene followed by 3 parts of itaconic acid were added to the reaction vessel. After the vessel had been purged to remove air, 75 parts of liquid butadiene were poured into the reaction mixture. The reaction vessel was then brought to a temperature of about 135° F. and finally held at 150° F., with the reaction mixture being agitated so as to form an emulsion. When the polymerization reaction had reached approximately 95 percent conversion, the agitation was stopped and the unreacted monomers and some water were removed by vacuum stripping. This produced an emulsion having a total solids content of about 43 percent expressed in weight of dry solids based on the total weight of the emulsion. Ammonium hydroxide (28 percent solution) was added to the emulsion until a pH of 8.8 was reached. To the latex then formed was added 0.7 part of a non-staining antioxidant (an alkylated phenol) referred to 100 parts of dry solids. This latex is referred to as latex #1.

EXAMPLE II

A butadiene-methyl methacrylate copolymer latex was prepared at a polymerization temperature of about 131° F. in a manner similar to that set forth in Example I with the exception that the prepared latex was not neutralized. The reaction mixture had the following recipe (all parts being parts by weight unless otherwise specified):

| | |
|---|---|
| Butadiene | 50 |
| Methyl methacrylate | 50 |
| Distilled water | 150 |
| Emulsifier [1] | 3.0 |
| Ethylenediaminetetraacetic acid | 0.04 |
| Tertiary dodecyl mercaptan | 0.5 |
| Potassium persulfate | 0.075 |

[1] Sipex EST, a sodium salt of tridecyl ether sulfate (produced by Alcolac Chemical Corporation).

After the unreacted monomers were removed, 100 parts of the resulting emulsion was admixed with 0.5 part of Prestabit Oil V (a purified sulfated fatty acid), 0.5 part of a sodium salt of hydroxy ethyl ethylene diamine triacetic acid, 1.0 parts of an antioxidant (an alkylated phenol), and 0.5 part of Santowhite to produce a stabilized latex designated as latex #2.

EXAMPLE III

Using emulsion polymerization techniques similar to those outlined in Example I, a butadiene-styrene copolymer was prepared at temperatures from 130° to 160° F. in an alkaline system maintained at a pH of from 10 to 10.5 by the addition of a 5 percent solution of sodium hydroxide throughout the reaction. The following recipe was used (all parts being by weight):

| | |
|---|---|
| Butadiene | 50 |
| Styrene | 50 |
| Distilled water | 150 |
| Emulsifier [1] (+2.0 injection) | 5.0 |
| Chelating agent [2] | 0.04 |
| Tertiary dodecyl mercaptan | 0.65 |
| Potassium persulfate | 0.5 |

[1] A modified rosin acid soap.
[2] An alkali metal salt of a polyamino carboxylate.

The resulting latex is designated as latex #3.

EXAMPLE IV

Using the three latices prepared in Examples I, II and III respectively, a unifying latex composition (Latex A) was prepared by admixing equal weight proportions of each latex with agitation and with the addition of 0.1 part of formaldehyde and 0.7 part of an antioxidant (an alkylated phenol). This latex composition is designated as Latex A in the following table. A latex of a carboxylated nitrile copolymer was used as a control to show the improved results obtained by the latex compositions of the invention.

In addition, other latex mixtures (Latex B and C) were prepared by admixing only two of the prepared latices in order to show the adverse effects resulting from omission of one of the necessary diene copolymers. Latex B consists of 33 percent by weight of latex #2 and 67 percent by weight of latex #3; whereas Latex C consists of 67 percent by weight of latex #1 and 33 percent by weight of latex #3.

Sheets of creped masking tape base (Duracel 301M) were submerged in latices. Each sheet was dipped for a period sufficient to obtain complete saturation of the tape base with the latex composition. The impregnated sheets were then withdrawn from the latex and excess latex removed by passing the sheets through squeeze rolls maintained under light pressure. After squeeze rolling, the impregnated paper was dried at a temperature of about 220° F. for a period of about 10 minutes to produce a paper having a polymer content of 90 percent on a dry basis of the weight of the untreated masking tape base. This paper was cured for about one minute at about 400° F. The paper sheets were then subjected to a series of tests to determine the tensile strength (both wet and dry), internal bond strength represented as delamination resistance, elongation, Elmendorf, and edge tear properties developed by the impregnation with the particular unifying latex compositions.

Internal bond tests: internal bond strength is determined by measurement of resistance to delamination of the polymer impregnated sheets. The test is identified as the Permacel Tape Corporation Ply Adhesion Test. Such tests were conducted by taking sample sheets and sealing heat sensitive adhesive cloth backed tape to the front and back surfaces of the sample. The sample was reduced to 1 inch by 8 inches in size and placed in the jaws of a tensile machine. By operation of the machine, the two outer pieces of cloth backed tape were pulled apart at the rate of 12 inches per minute and the splitting or delamination of the impregnated paper sheet took place. The force required to continue the failure of the sheet by splitting or delamination was measured on a tensile testing machine (a Thwing-Albert Tensile Machine with a recording device) and this measured force was reported as the internal bond strength of the saturated paper in ounces per inch of width of test sample.

Tests for tensile strength of the impregnated paper were conducted by taking 1 inch by 8 inch samples of the impregnated paper and placing the ends thereof in the jaws of a standard tensile testing machine. The tensile strength was recorded by stretching the paper at the rate of 12 inches per minute in the machine direction of the paper and the pounds per inch of width at which the sample failed in tension were recorded as the tensile strength of the sample. In like manner, the percentage of elongation being measured in the machine direction (MD) and cross direction (CD) of the paper sheet. Edge tear is evaluated by the Finch Edge Tear Test (Tappi) Standard Method T470M–54 and the Elmendorf is obtained by the Tappi Method T–414M42.

In the following table, the results of the tests of the above properties of the impregnated paper sheets are recorded.

TABLE I

| | Control | A | B | C |
|---|---|---|---|---|
| MD Tensile (lbs./inch) | 15.0 | 14.8 | 11.7 | 13.7 |
| MD Elongation (percent) | 20.0 | 27.0 | 30.0 | 22.0 |
| CD Elmendorf (grs.) | 59.0 | 75.0 | 77.0 | 56.0 |
| Delamination Resistance (oz./inch) | 67.2 | 60.8 | 54.4 | 62.5 |
| MD Wet Tensile (lbs./inch) | 10.2 | 8.2 | 2.1 | 8.9 |
| MD Wet Elongation (percent) | 27.0 | 32.0 | 33.0 | 30.0 |
| CD Edge Tear (lbs.) | 17.5 | 27.0 | 23.2 | 19.4 |

EXAMPLE V

In this example the latex compositions prepared in Example IV are tested for their adhesive bonding properties by impregnating a paper base. A flat back base (not creped) was used to eliminate the irregularities in tearing due to the crepe pattern. The flat back was saturated with the control latex, the latex composition of this invention and each of the latex compositions having the reduced fiber-bonding properties.

The following static shear test was used to evaluate the adhesive-bonding properties of the tape: A 2-mil (dry) adhesive coating is applied to the test tape stock, dried at room temperature and cured for three minutes at 250° F. One day is then allowed before testing, for interaction between the adhesive and base to come to equilibrium. A one-inch strip is then cut out and one linear inch of this strip adhered to a standard test panel. The other end of the strip is weighted with a one pound weight and the test panel supported vertically. The amount of slippage during a given period, i.e., about 24 hours, is a measure of the bond between the tape and the pressure-sensitive adhesive.

As shown in the following table, the latex compositions of this invention show excellent adhesive for the pressure-sensitive adhesive without a tie-coat while the others do not.

TABLE 2

| Saturant: | Slippage |
|---|---|
| Control latex | Fell from panel. |
| Latex A | Slipped about 1/16". |
| Latex B | Fell from panel. |
| Latex C | Do. |

While the novel features of the invention have been shown and described and are pointed out in the appended claims, it is to be understood that various omissions, substitutions and changes in embodiments herein may be made by those skilled in the art without departing from the spirit and scope of the invention.

What is claimed is:

1. A latex composition characterized by enhanced adhesive-bonding and fiber-bonding properties comprising a mixture of polymer solids uniformly dispersed in an aqueous dispersion; said mixture containing from about 15 to about 50 percent by weight of at least one acrylic ester-diene copolymer produced from monomeric mixtures containing from about 30 to about 75 percent of at least one aliphatic conjugated diene, and from about 25 to about 70 percent of at least one alkyl ester of an acrylic acid; from about 20 to about 40 percent by weight of at least one carboxyl-containing diene copolymer produced from monomeric mixtures containing from about 20 to about 90 percent of at least one aliphatic conjugated diene, from about 10 to about 75 percent of at least one non-carboxylic ethylenically unsaturated monomer, and from about 0.5 to about 20 percent of at least one carboxyl-containing monomer; and from about 25 to about 60 percent of at least one other diene copolymer produced from monomeric mixtures containing from about 30 to about 65 percent of at least one aliphatic conjugated diene and from about 35 to about 70 percent of at least one non-carboxylic ethylenically unsaturated monomer other than an acrylic ester, said copolymers being prepared by emulsion polymerization in an aqueous medium and said weight percentages of said copolymers being based on the total polymer solids in said aqueous dispersion.

2. The latex composition of claim 1 in which said carboxyl-containing monomer used to produce the carboxyl-containing diene copolymer is selected from the group consisting of olefinically unsaturated polycarboxylic acids and partial esters thereof.

3. The latex composition of claim 1 in which the non-carboxylic ethylenically unsaturated monomer is selected from the group consisting of nitriles, styrenes and lower molecular weight alcohol esters of acrylic or alpha-substituted acrylic acids.

4. An impregnating composition characterized by enhanced adhesive-bonding and fiber-bonding properties comprising a stable latex composition comprised of an aqueous dispersion containing about equal weight proportions of (1) a copolymer prepared from a monomeric mixture of from about 20 to about 90 percent of a conjugated diene, from about 10 to about 75 percent of a non-carboxylic ethylenically unsaturated monomer, and from about 0.5 to about 20 percent of a carboxyl-containing monomer selected from the group consisting of polycarboxylic acids and their partial esters, (2) a copolymer produced from a monomeric mixture containing about 30 to about 75 percent of an aliphatic conjugated diene and from about 25 to about 70 percent of a lower molecular weight alcohol ester of acrylic or alpha-substituted acrylic acids, and (3) a copolymer prepared from a monomeric mixture containing from about 30 to about 65 percent of a conjugated aliphatic diene, and from about 35 to about 70 percent of a non-carboxylic ethylenically unsaturated monomer other than an acrylic ester, said copolymers being prepared by emulsion polymerization in an aqueous medium and said weight proportions being based on the total copolymer solids in the aqueous dispersion.

5. A fibrous article comprising a unifying mass of non-woven fibrous material internally bonded with a unifying composition comprising a mixture of uniformly dispersed polymer solids; said mixture containing from about 15 to about 50 percent by weight of at least one acrylic ester-diene copolymer produced from monomeric mixtures containing from about 30 to about 75 percent of at least one aliphatic conjugated diene, and from about 25 to about 70 percent of at least one alkyl ester of an acrylic acid; from about 20 to about 40 percent by weight of at least one carboxyl-containing copolymer produced from monomeric mixtures containing from about 20 to about 90 percent of at least one aliphatic conjugated diene, from about 10 to about 75 percent of at least one non-carboxylic ethylenically unsaturated monomer, and from about 0.5 to about 20 percent of at least one carboxyl-containing monomer; and from about 25 to about 60 percent of at least one other diene copolymer produced from monomeric mixtures containing from 30 to about 65 percent of at least one aliphatic conjugated diene and from about 35 to about 70 percent of at least one non-carboxylic ethylenically unsaturated monomer other than an acrylic ester said copolymers being prepared by emulsion polymerization in an aqueous medium and said weight percentages being based on the total polymer solids in said mixture.

6. The article of claim 5 in which said carboxyl-containing monomer used to produce the carboxyl-containing diene copolymer is selected from the group consisting of olefinically unsaturated polycarboxylic acids and partial esters thereof.

7. The article of claim 5 in which the non-carboxylic ethylenically unsaturated monomer used to produce the carboxyl-containing diene copolymer is selected from the group consisting of nitriles, styrenes and lower molecular weight alcohol esters of acrylic or alpha-substituted acrylic acids.

8. A fibrous article comprising a non-woven fibrous web characterized by high resistance to delamination, improved edge tear and excellent adhesive bond for pressure sensitive adhesives; said web being internally bonded with a unifying composition comprising a mixture of polymer solids dispersed within said web, said mixture containing equal weight proportions of (1) a copolymer prepared from a monomeric mixture of from about 20 to about 90 percent of a conjugated diene, from about 10 to about 75 percent of a non-carboxylic ethylenically unsaturated monomer, and from about 0.5 to about 20 percent of a carboxyl-containing monomer selected from the group consisting of polycarboxylic acids and their partial esters, (2) a copolymer produced from a monomeric mixture containing from about 30 to about 75 percent of an aliphatic conjugated diene and from about 25 to about 70 percent of a lower molecular weight alcohol ester of acrylic or alpha-substituted acrylic acids, and (3) a copolymer prepared from a monomeric mixture containing from about 30 to about 65 percent of a conjugated aliphatic diene, and from about 35 to about 70 percent of a non-carboxylic ethylenically unsaturated monomer other than an acrylic ester, said copolymers having been prepared by emulsion polymerization in an aqueous medium and said weight proportions being based on the total polymer solids in the mixture.

9. A normally tacky pressure-sensitive adhesive tape comprising a flexible paper backing sheet internally bonded with a unifying composition and a pressure-sensitive adhesive strongly bonded to said backing sheet without the use of a tie coat; said unifying composition comprising a mixture of polymer solids uniformly dispersed on said backing sheet; said mixture comprising about equal weight proportions of a copolymer prepared from a monomeric mixture of about 75 percent butadiene, about 22 percent styrene and about 3 percent of itaconic acid, a copolymer prepared from a monomeric mixture containing about 50 percent of butadiene and about 50 percent of methyl methacrylate and a copolymer prepared from a monomeric mixture of about 50 percent butadiene and 50 percent styrene; said copolymers being prepared by emulsion polymerization in an aqueous medium and said weight proportions being based on the total polymer solids in said mixture.

10. A method for enhancing the physical properties of a flexible backing sheet for tapes and for eliminating the need for a tie-coat to bond pressure sensitive adhesives thereto which comprises (1) impregnating said backing sheet with a unifying latex composition comprising an aqueous dispersion containing from about 15 to about 50 percent by weight of at least one acrylic ester-diene copolymer produced from monomeric mixtures containing from about 30 to about 75 percent of at least one aliphatic conjugated diene, and from about 25 to about 70 percent of at least one alkyl ester of an acrylic acid; from about 20 to about 40 percent by weight of at least one carboxyl-containing copolymer produced from monomeric mixtures containing from about 20 to about 90 percent of at least one aliphatic conjugated diene, from about 10 to about 75 percent of at least one non-carboxylic ethylenically unsaturated monomer, and from about 0.5 to about 20 percent of at least one carboxyl-containing monomer and from about 25 to about 60 percent of at least one other diene copolymer produced from monomeric mixtures containing from about 30 to about 65 percent of at least one aliphatic conjugated diene, and from about 35 to about 70 percent of at least one non-carboxylic ethylenically unsaturated monomer other than an acrylic ester, said copolymers being prepared by emulsion polymerization in an aqueous medium and; said, weight percentages being based on the total polymer solids in said aqueous dispersion, (2) drying and (3) thereafter heat treating to cure said copolymers.

References Cited

UNITED STATES PATENTS

| | | | |
|---|---|---|---|
| 2,785,143 | 3/1957 | Edgerley | 260—83.5 |
| 3,103,498 | 9/1963 | Scriba et al. | 260—894 |
| 3,193,446 | 7/1965 | Eisenberg | 260—894 |

MURRAY TILLMAN, *Primary Examiner.*

W. J. BRIGGS, *Assistant Examiner.*